United States Patent
Li (12)

(10) Patent No.: US 6,509,550 B1
(45) Date of Patent: Jan. 21, 2003

(54) ROASTING OVEN WITH DUAL HEATING ELEMENTS

(76) Inventor: George T. C. Li, 697 E. College Pkwy., Suite 26, Carson City, NV (US) 89706

( * ) Notice: Subject to any disclaimer, the term of this patent is extended or adjusted under 35 U.S.C. 154(b) by 0 days.

(21) Appl. No.: 09/971,286

(22) Filed: Oct. 5, 2001

(51) Int. Cl.⁷ .......................... A47J 27/20; A47J 37/00; F27B 11/02; H05B 3/34
(52) U.S. Cl. ...................... 219/433; 219/386; 219/432; 219/402; 219/542
(58) Field of Search .................................. 219/433, 415, 219/417, 429, 432, 436, 385, 386, 542, 546, 528, 535

(56) References Cited

U.S. PATENT DOCUMENTS

| | | | | |
|---|---|---|---|---|
| 1,046,888 A | * | 12/1912 | Stanley | 219/436 |
| 2,187,888 A | * | 1/1940 | Nachumsohn | 219/417 |
| 2,265,295 A | * | 12/1941 | Layton | 219/436 |
| 2,292,854 A | * | 8/1942 | Wilcox | 219/436 |
| 3,218,434 A | * | 11/1965 | Lee et al. | 219/385 |
| 3,243,576 A | * | 3/1966 | Lee et al. | 219/386 |
| 3,393,295 A | | 7/1968 | Jepson et al. | 219/398 |
| 3,850,331 A | * | 11/1974 | Oxel | 219/403 |
| 3,881,090 A | * | 4/1975 | Scott | 219/433 |
| 4,024,377 A | | 5/1977 | Henke | 219/439 |
| 4,591,698 A | * | 5/1986 | Chang | 219/432 |
| 5,359,179 A | * | 10/1994 | Desloge et al. | 219/535 |
| 5,526,734 A | * | 6/1996 | Harrison | 219/400 |
| 5,590,583 A | * | 1/1997 | Harrison | 219/400 |
| 6,170,388 B1 | * | 1/2001 | Shovick | 99/331 |
| 6,274,847 B1 | * | 8/2001 | Hlava et al. | 219/433 |

FOREIGN PATENT DOCUMENTS

DE 3606800 * 9/1987

* cited by examiner

Primary Examiner—Joseph Pelham
(74) Attorney, Agent, or Firm—Clifford E. Rey

(57) ABSTRACT

A roasting oven having a large capacity heating well including a wrap-around heating element for heating the side walls thereof and a top heating element for browning is disclosed. A function control panel featuring a touch-film interface and digital display of cooking modes is provided for the user's convenience. In an alternative embodiment standard electromechanical switches and rheostatic temperature controls provide the functions of the present oven. The heating elements are also fabricated in alternative embodiments to provide single-sided or double-sided configurations for particular applications. The power supply circuit board is isolated from the heating elements in a ventilated compartment on an undersurface of the roasting oven to prevent damage thereto from exposure to the heat source. The present roasting oven is provided with an optional serving set conforming to the shape of the heating well to maintain food in a warmed condition.

17 Claims, 14 Drawing Sheets

ROASTING OVEN WITH DUAL HEATING ELEMENTS

BACKGROUND OF INVENTION

1. Field of Invention

The present invention relates to cooking appliances and, more particularly, to a large capacity, roasting oven having a wrap-around type heating element for applying heat to the cooking vessel and a top heater element for browning.

Electric cooking pots for preparing and serving hot foods are well known to those skilled in the art. Such electric cooking pots typically include a heating element arranged in functional relation underneath the bottom surface of the cooking well for supplying heat. Such cooking wells are often constructed of stainless steel or enameled steel for reasons of durability and sanitation. However, it is known that both stainless steel and enameled steel have relatively low coefficients of heat conductivity as compared with other metals.

This presents a particular problem for cooking vessels of large capacity (ie. up to 26 quarts). Applying heat only to the bottom surface of such a large capacity cooking vessel, especially when constructed of stainless steel or enameled steel, can result in the upper portion of the cooking vessel being insufficiently heated. Thus, the food in the upper portion of the cooking vessel may become too cool for serving purposes due to the loss of heat in combination with the low rate of heat conductivity and the slow rate at which heat is supplied to the upper portion of the cooking vessel.

The heat distribution problem is compounded in a roasting oven of large capacity and cannot be resolved by simply increasing the power output of the heating element. This is due to the fact that the increased heater output tends to overheat and to cause malfunction of the temperature control components and electronic circuitry, which are typically contained within the oven housing. Thus, the present roasting oven with a food serving system has been developed to solve these problems and other shortcomings of the prior art.

2 Description of the Prior Art

One example of a prior art deep well cooker is disclosed in U.S. Pat. No. 4,024,377 to Henke comprising a heat sink preferably formed of aluminum or another corrosion resistant metal having a relatively high coefficient of heat conductivity, which is positioned over the deep well member from below. The heat sink member is generally U-shaped and has a bottom part parallel to and spaced from the bottom of the well member and side parts parallel to and engaging the sides of the well member in heat exchanging relation. An electric heating element is disposed in the space between the bottom of the well member and the bottom part of the U-shaped heat sink member. When the electric heater is energized, heat is supplied to the bottom of the well member by direct radiation and by radiation from the bottom part of the U-shaped member and by convection due to the air in the space occupied by the heating element. Simultaneously, however, heat also flows from the bottom part of the U-shaped member, up side parts of the U-shaped member, and into the sides of the well member. The heat supplied by conduction to the sides of the well member provides for more uniform heating of the well member while also providing for more efficient utilization of the energy supplied to the heating element. However, this device is designed for use with a deep well cooker having a capacity of approximately 8–12 quarts based on the dimensions provided in the specifications. This device necessarily becomes less efficient when applied to a larger capacity cooker having increased side wall dimensions.

Another example of a prior art cooking device having multiple heating elements is disclosed in U.S. Pat. No. 3,393,295 to Jepson et. al. comprising a pan with a lower electric heating element supported on its underside and a deep cover with an upper heating element supported within. A thermostatic control is connected to the lower heating element for energization thereof When the cover is closed, an electrical connection for energizing the upper heating element is completed. The control serves thermostatically to control the energization of either element in a repeating, alternating sequence and is capable of performing the functions of a frying pan, broiler, and oven. However, this invention is not directly applicable to deep well cookers nor does it disclose a wraparound heating element for controlling heat distribution to the upper surfaces of a deep well member within such a cooker.

Thus, the present invention has been developed to provide a solution to the problem of regulating the distribution of heat to all surfaces within a deep well cooker having a large capacity up to 26 quarts.

SUMMARY OF THE INVENTION

Accordingly, the present invention provides an roasting oven having a large capacity (i.e. up to 26 quarts) that includes a wrap-around heating element, which is disposed about the heating well for heating the sides thereof and a top heating element for browning (ie. to scorch slightly in cooking) mounted within the oven lid. The wrap-around heating element and the top heating element are interconnected by a temperature control for heat regulation and a function control switch for selectively energizing the desired heating elements individually or in combination. Both the wrap-around heating element and the top heating element are constructed of mica insulation board with die-cut notches formed along the lateral edges thereof to permit uniformly spaced winding of heater wires for even heating. In the present invention the power supply circuit board is located within a vented exterior compartment on the bottom surface of the roasting oven to avoid the high temperature environment inside the housing. The present roasting oven includes serving containers for maintaining the cooked food in ready-to-eat condition and for reheating leftover food items.

Other features and technical advantages of the present invention will become apparent from a study of the following description and the accompanying drawings.

BRIEF DESCRIPTION OF THE DRAWINGS

The novel features of the present invention are set forth in the appended claims. The invention itself however, as well as other features and advantages thereof will be best understood by reference to the following detailed description of an illustrative embodiment when read in conjunction with the accompanying figures wherein:

DETAILED DESCRIPTION OF THE PREFERRED EMBODIMENTS

Figure 1:
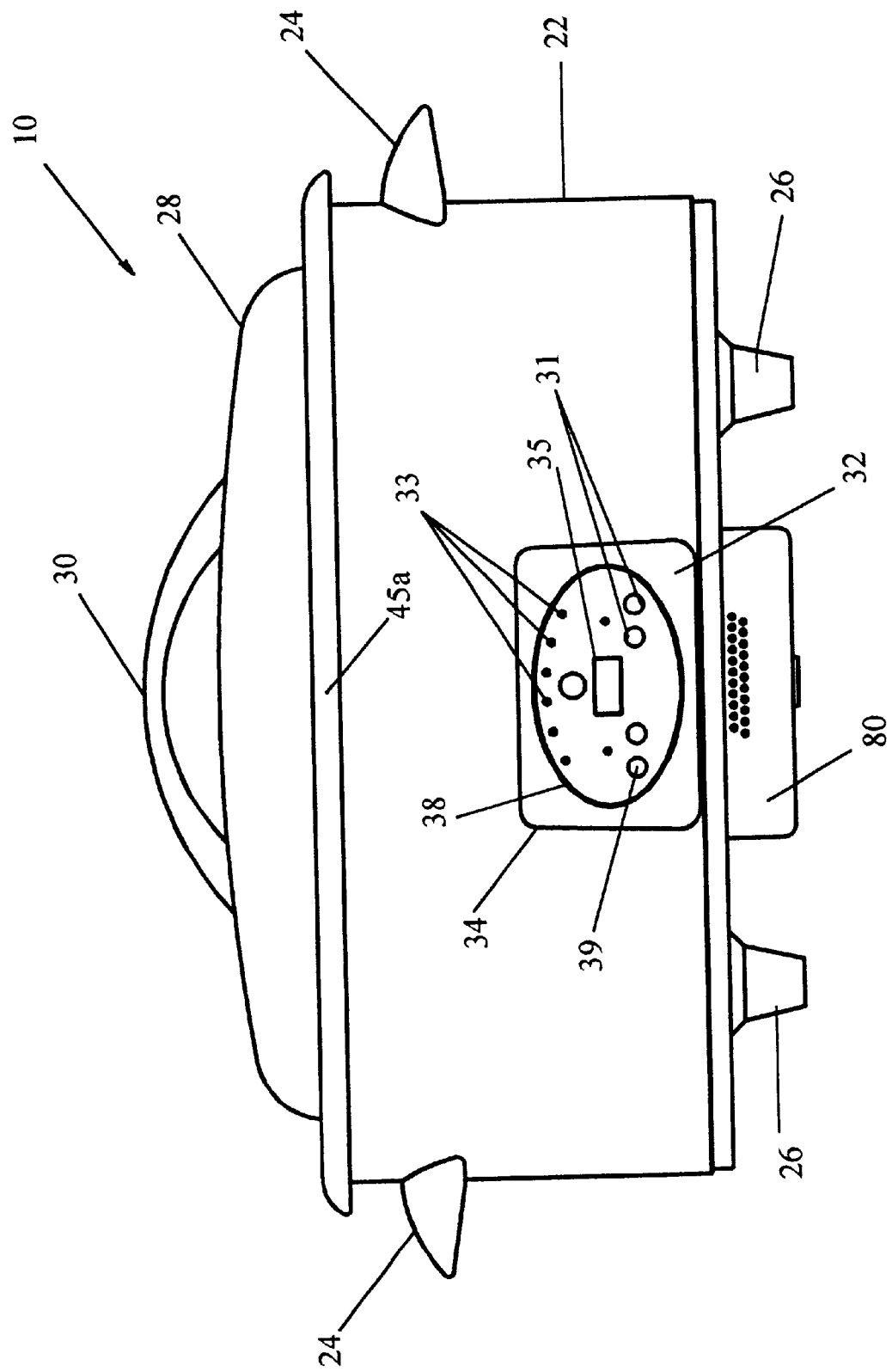
FIG. 1 is a front elevational view of the roasting oven of the present invention.

With further reference to the drawings, there is shown therein a preferred embodiment of a roasting oven in accordance with the present invention, indicated generally at 10, and illustrated in FIG. 1. The present roasting oven 10 is comprised of an outer housing 22 equipped with external handles 24 and feet 26. The roasting oven 10 is also provided with a lid 28 equipped with a handle 30. In the preferred embodiment the housing 22 is constructed of sheet steel or other suitable material and is provided in different exterior finishes such as powder coating, stainless steel, or plated steel.

Figure 2A:
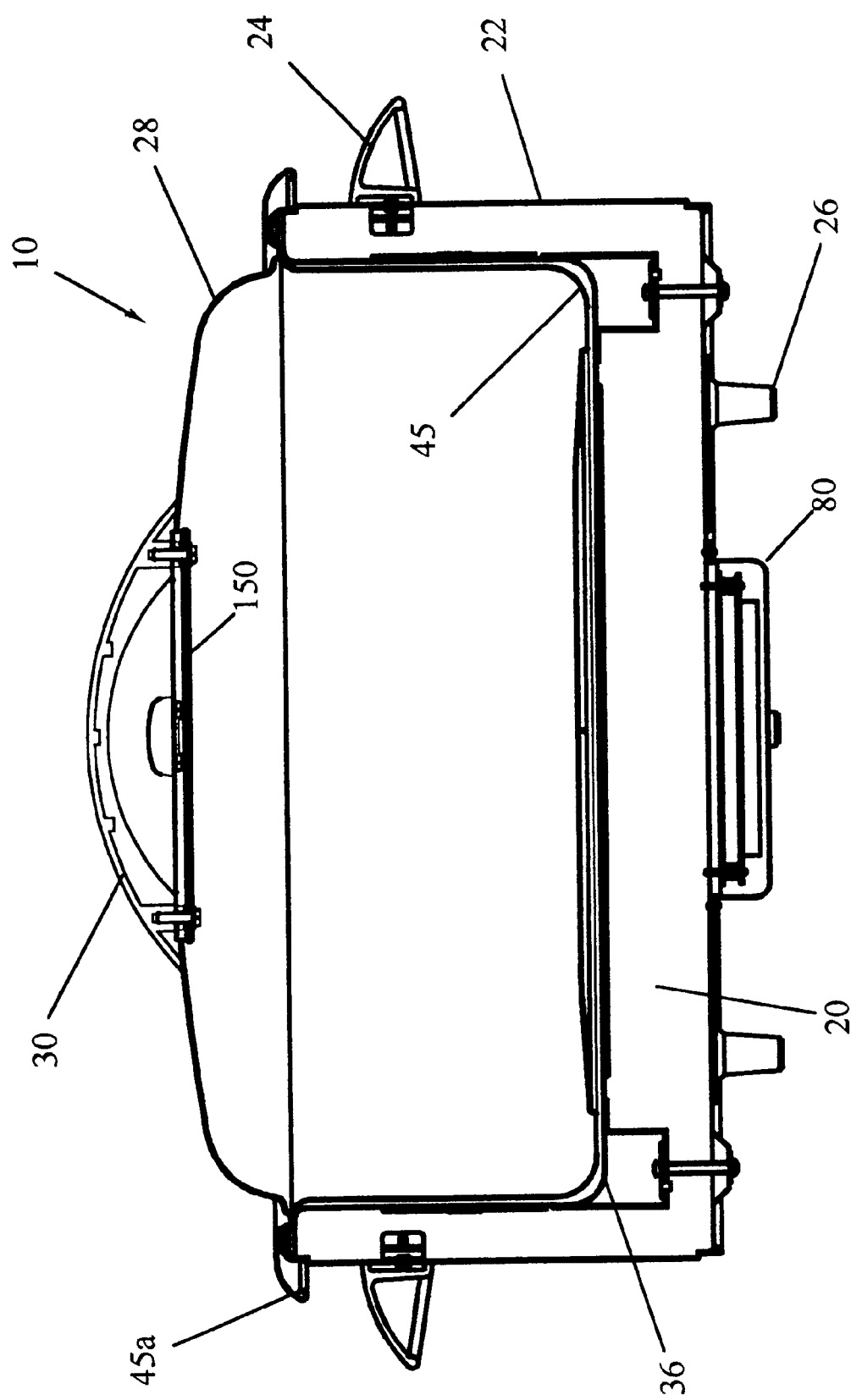
FIG. 2A is a longitudinal cross-section of the roasting oven showing details of the construction thereof.
Figure 2B:
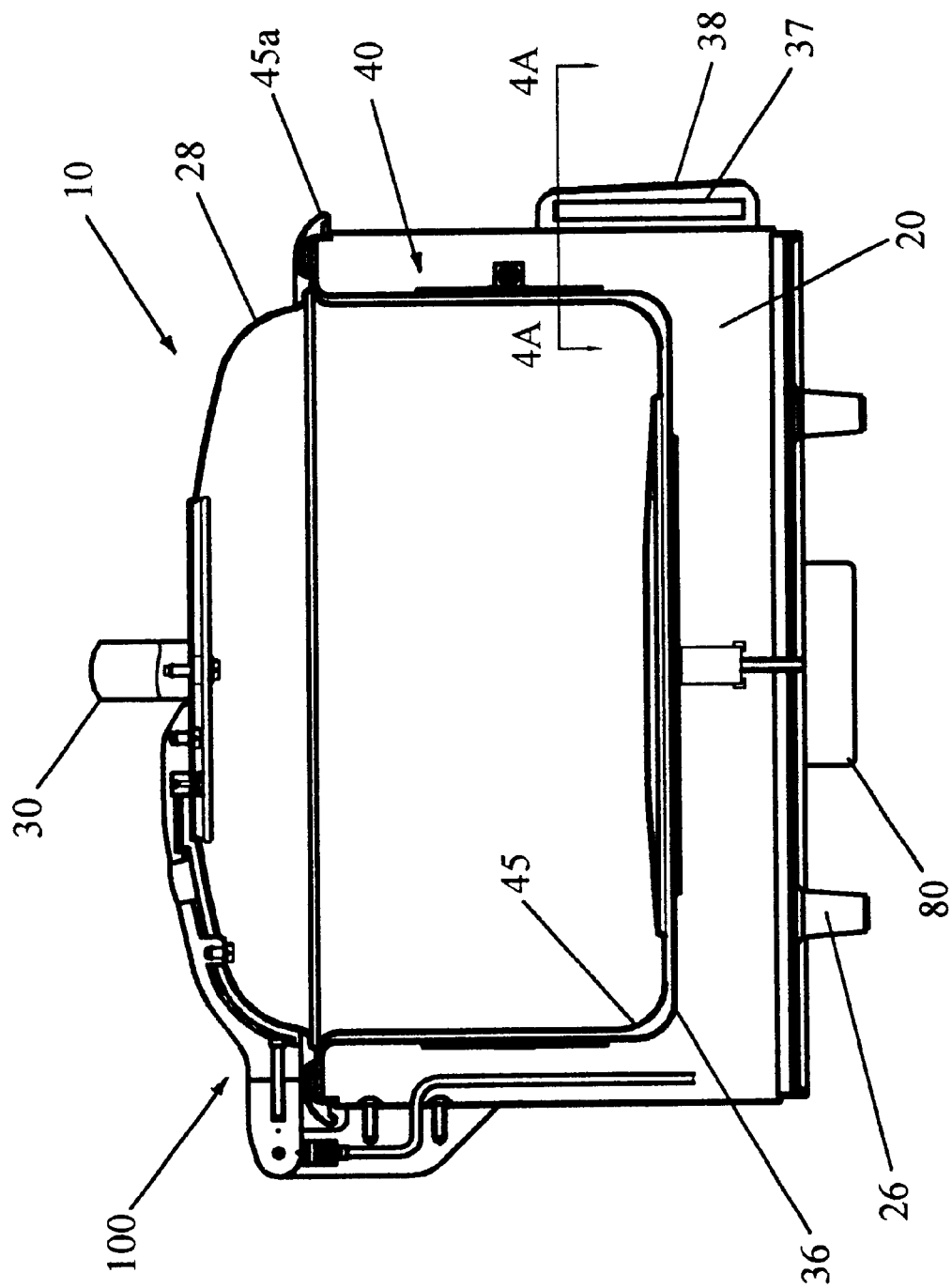
FIG. 2B is a transverse cross-section of the roasting oven showing further details thereof including the hinge mechanism.

The present roasting oven 10 also includes an internal heating well 36 disposed within the housing 22 as more clearly shown in FIGS. 2A and 2B. The heating well 36 is constructed of enamel-coated steel, cast aluminum, cast iron or other suitable material. The present oven 10 features a wrap-around heating element, indicated generally at 40, and a top heating element, indicated generally at 150, as described hereinafter in further detail.

In the preferred embodiment the present roasting oven 10 also includes a removable cooking liner 45 including a peripheral flange member 45a which is seated on the upper edge of the housing 22 as shown. The liner 45 is also constructed of stainless steel, enamel-coated steel, cast aluminum or other suitable material. The cooking liner 45 is easily removed from the heating well 36 for washing for the convenience of the user.

A layer of heat-resistant insulating material (not shown) is disposed in the air space as at 20 between the housing 22 and the cooking well 36 as shown in FIGS. 2A and 2B. Numerous types of heat insulating materials having physical and chemical properties suitable for this application are commercially available. Since such heat insulating materials are well known to those skilled in the art, further detailed discussion of the same is not deemed necessary.

Figure 3:
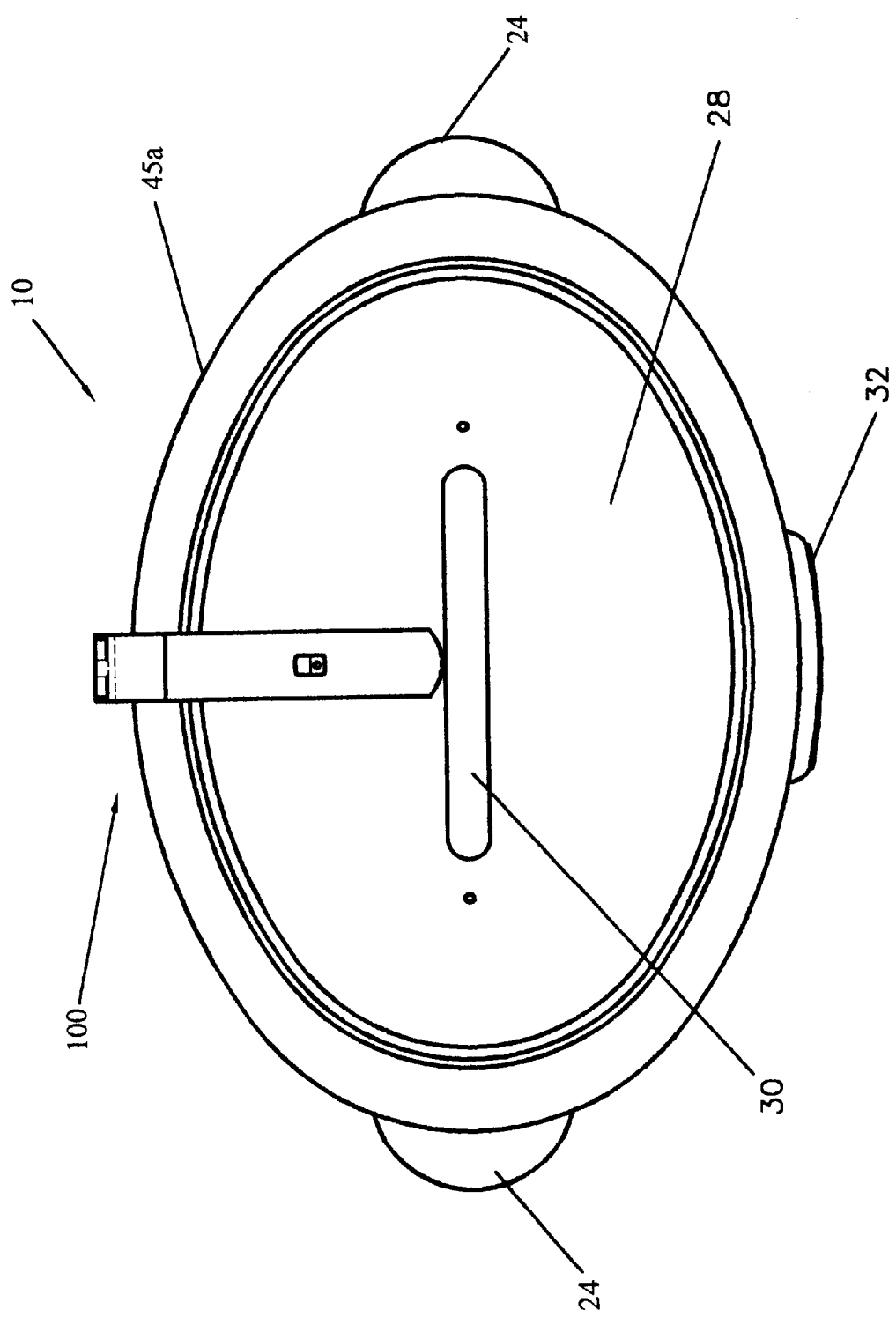
FIG. 3 is a top plan view of the roasting oven of the present invention.

Referring now to FIG. 3, the present roasting oven 10 is oval-shaped in the preferred embodiment. In this configuration, it has been determined that optimal heating of the side wall surfaces of the large capacity (i.e. up to 26 quarts) heating well 36 can be achieved at all times. However, it will be appreciated that the roasting oven 10 may be constructed in a circular, square, or rectangular configurations with minor modifications to the heating elements.

Referring again to FIG. 1, a control panel, indicated generally at 32, is provided on the lower front surface of the housing 22 to carry out the functions of this embodiment of present roasting oven 10. The control panel 32 includes a plurality of temperature control switches 33 which are electrically interconnected with the wrap-around and top heating elements 40, 150 and serve to regulate the operation thereof. The control panel 32 also includes a digital display 35, cooking mode switches 31, and a power switch 39.

In the preferred embodiment the control panel 32 is comprised of a heat-resistant housing 34 including a flexible, push button film 38 which overlays an electronic control circuit board 37 (FIG. 2B) that provides the user with fingertip control of the cooking functions. A key innovation of the present oven 10 is a ventilated compartment 80 wherein the power supply circuit board 81 (FIG. 10) is protected from the heat source as explained hereinafter in further detail.

Figure 4A:
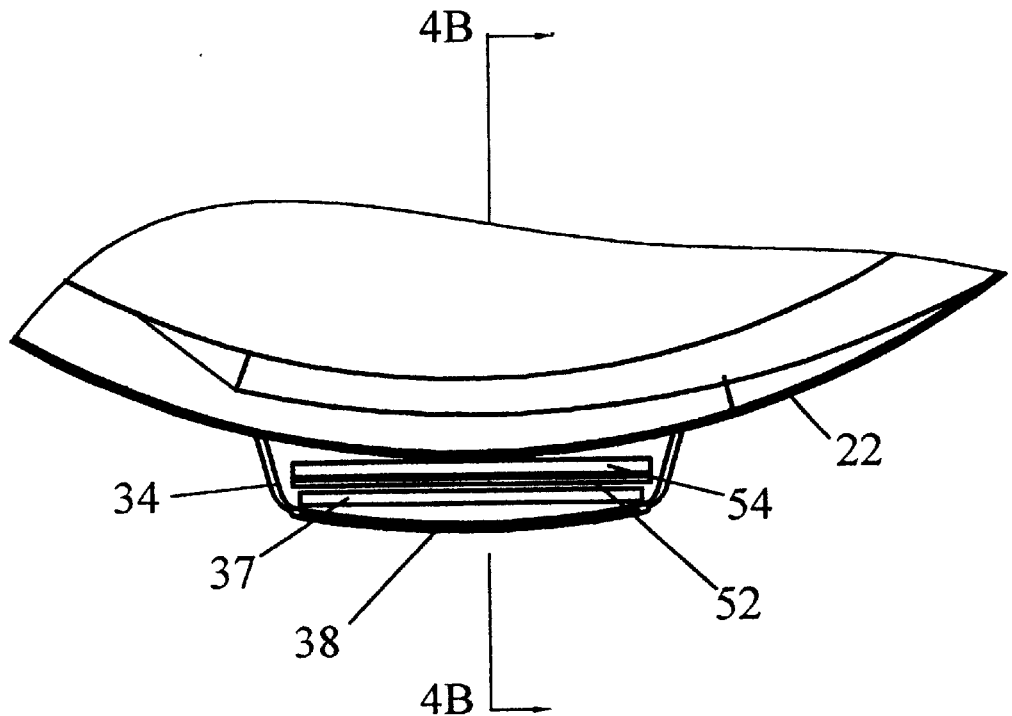
FIG. 4A is a partial horizontal section view taken along the section line 4A—4A of FIG. 2B showing the construction of the temperature control panel.
Figure 4B:
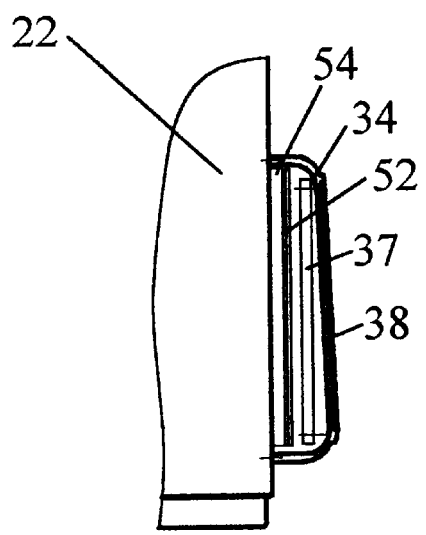
FIG. 4B is a partial vertical section view taken along the section line 4B—4B of FIG. 4A showing the construction of the temperature control panel.

As more clearly shown in FIGS. 4A and 4B the electronic control circuit board 37 is insulated from the wrap-around heating element 40, which is disposed around the outer circumference of the heating well 36, by layers of mica sheet insulation board installed as at 52 and/or fiberglass insulation material installed as at 54 adjacent the exterior of the housing 22.

Figure 5A:
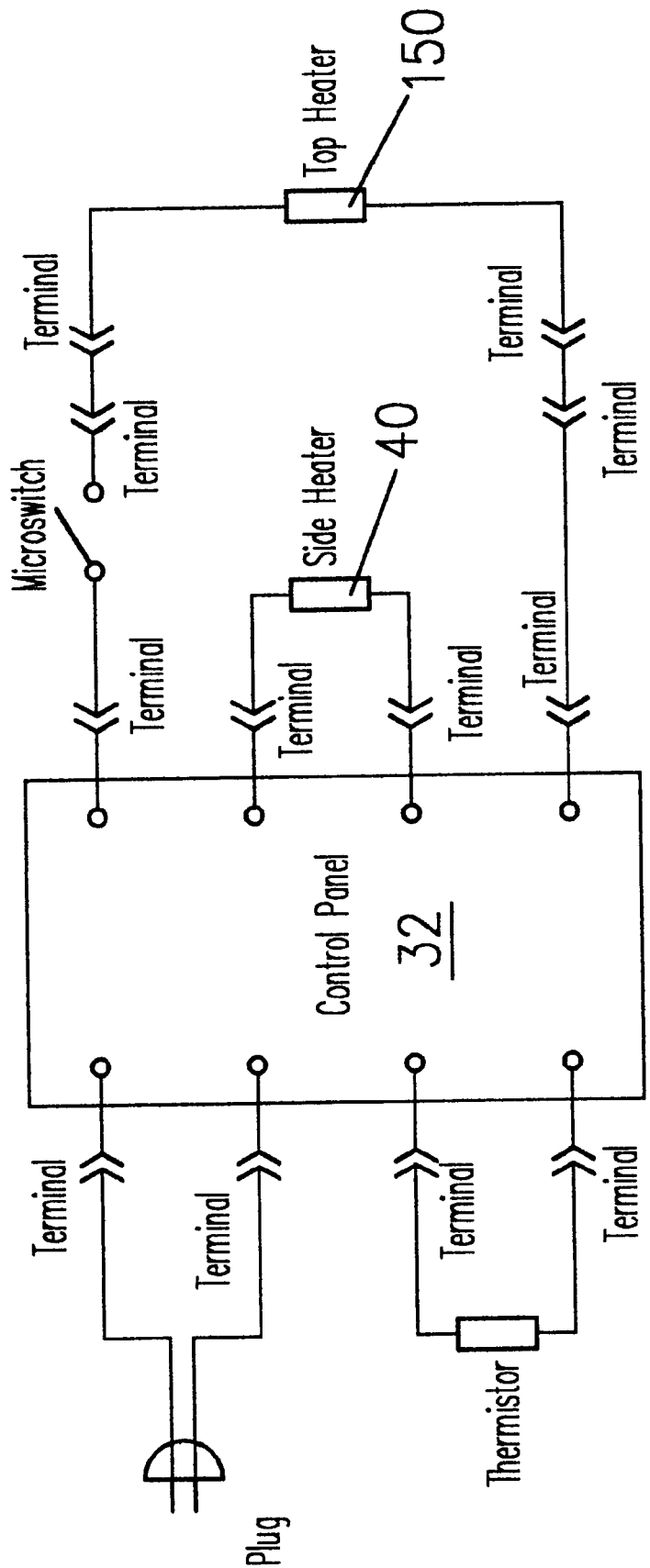
FIG. 5A is a schematic diagram representing the circuitry of the present roasting oven wherein an electronic control panel is utilized.
Figure 5B:
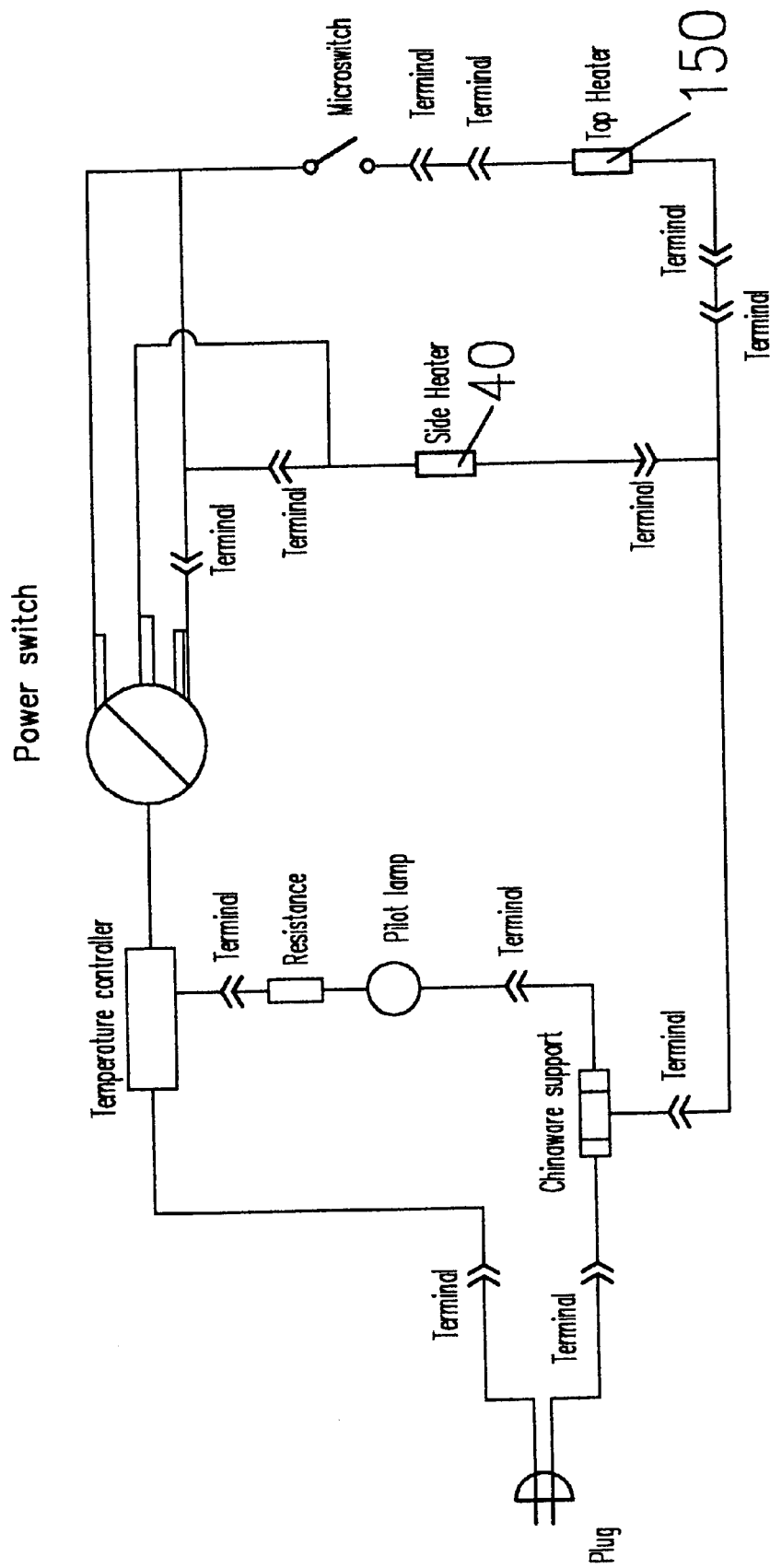
FIG. 5B is a schematic diagram representing an alternative embodiment of the circuitry wherein electromechanical switches and rheostatic temperature controls are utilized.

Referring now to FIGS. 5A and 5B, there are shown schematic representations of alternative embodiments of the present roasting oven 10. It will be appreciated by those skilled in the art that the electrical functions may be carried out by the electronic control panel 32 as shown in FIG. 5A or, in the alternative, by the use of standard electromechanical switches and rheostatic temperature control devices shown in FIG. 5B.

The present roasting oven 10 is designed for use with standard household electrical systems. In the preferred embodiment the wrap-around heating element 40 is designed to operate in the range of 1000–1500 watts and the top heating element 150 to operate in the range of 25 to 75 watts. This wattage rating varies for a given application and capacity of the oven.

Figure 6A:
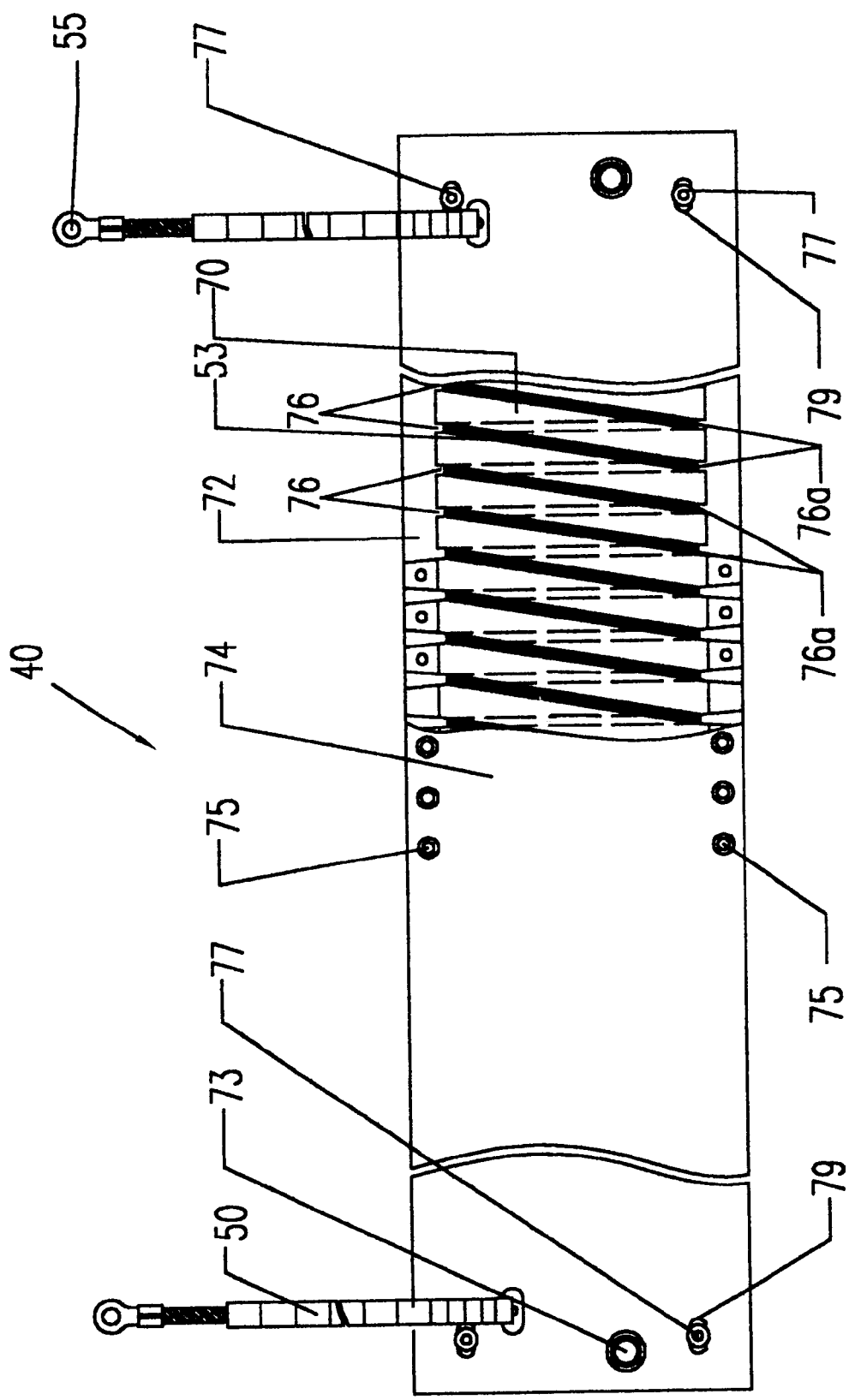
FIG. 6A is a partially cutaway elevational view showing the details of the construction of the heating elements in a double-sided configuration.
Figure 6B:
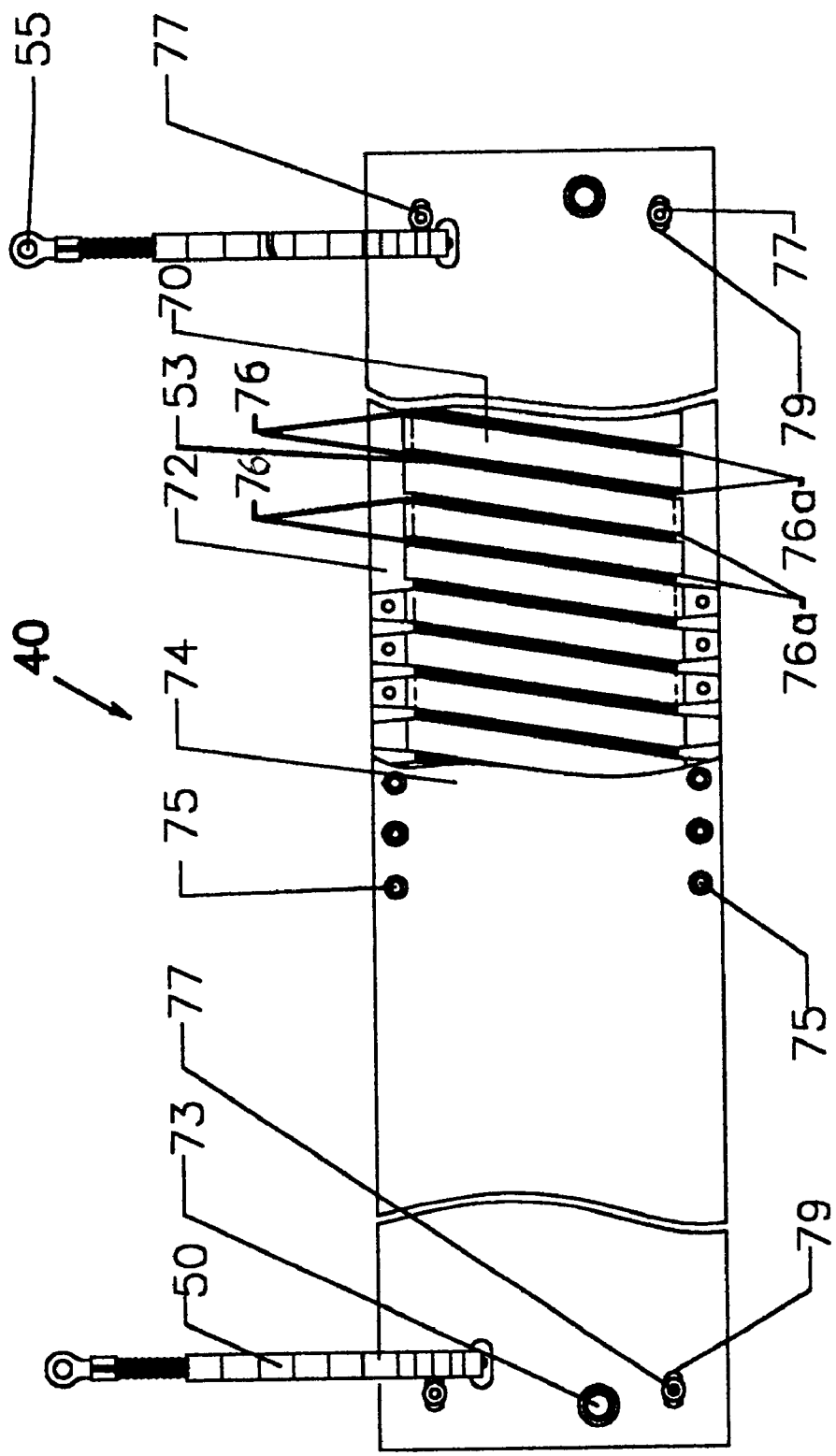
FIG. 6B is a partially cutaway elevational view showing the details of the construction of the heating elements in a single-sided configuration.

With reference to FIGS. 6A and 6B, the details of the construction of the present heating elements will be described. Both the wrap-around heating element 40 and the top heating element 150 are constructed as layered assemblies wherein a supporting mica sheet assembly, indicated generally at 70, is interposed between an interior mica insulation board 72 and an exterior mica insulation board 74. Since the physical and chemical properties of mica insulation board are well known to those skilled in the art, further detailed discussion of these materials is not deemed necessary.

Still referring to FIGS. 6A and 6B, it will be noted that the supporting mica sheet assembly 70 is fabricated with a plurality of die-cut notches 76 and 76a, which are formed at predetermined intervals along the opposite lateral edges thereof As shown in FIG. 6A, during the construction of the heating elements, the heater wire 53 is drawn across a pair of diagonally opposed notches as at 76 and 76a, wrapped in continuous revolutions around the supporting mica sheet 70, and advanced in this manner along the entire length thereof as shown by directional arrows. It will be appreciated that when constructed using the aforementioned technique, a so-called double-sided heating element having heating wire 53 disposed on both sides thereof is produced.

Using an alternative construction technique shown in FIG. 6B, a single-sided heating element can be produced by initially drawing the heater wire 53 across the supporting mica sheet 70 as described in the first step hereinabove. Next, the wire 53 is interlaced between adjacent notches 76 on the same lateral edge of the supporting mica sheet 70 as shown by directional arrows. Thereafter, the wire 53 is again drawn across the supporting mica sheet 70 to the next diagonally opposed notch 76a on the opposite lateral edge thereof. Next, the wire 53 is interlaced between adjacent notches 76a on the opposite lateral edge of the supporting mica sheet.

In this manner, it will be understood that a single-sided heater element having at least 75% of the total amount of heater wire 53 used in its construction disposed on one surface of the supporting mica sheet 70 may be produced. Such a single-sided heating element is advantageous in reducing the radially outward reflection of heat generated by the heating elements thereby improving heating efficiency and providing a cooler outer surface in the event of user contact for safety purposes.

In both of the above described embodiments, the supporting mica sheet 70 is permanently captured between the interior and exterior insulation boards 72 and 74, and secured at periodic intervals as shown by rivets 75 or other suitable fasteners to maintain alignment of the individual layers.

Figure 7:
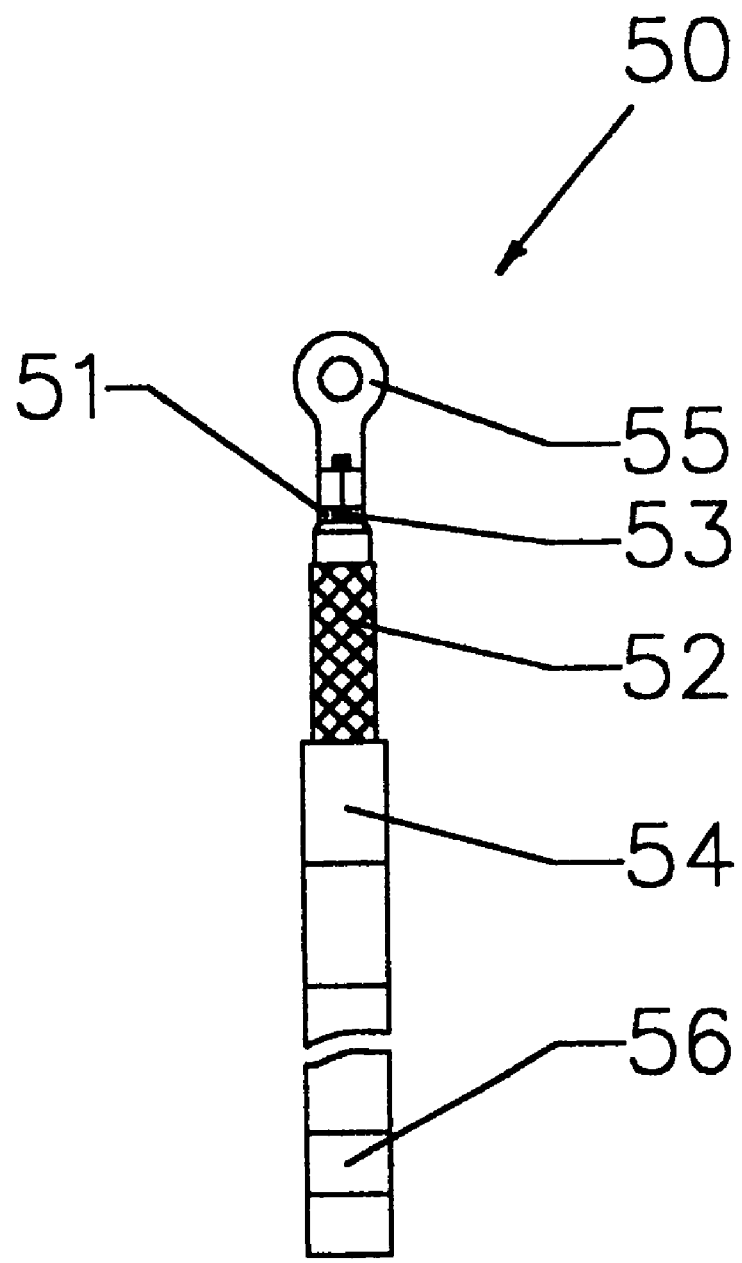
FIG. 7 is a plan view of the wire lead assembly of the heating element of the present invention.

Referring now to FIG. 7 there is shown therein a heater lead wire assembly, indicated generally at 50, for installation on the terminal ends of the heater wire 53. In the manufacturing process the terminal ends of the heater wire 53 are tightly twisted with a bundle of nickel conductors 51 to create a heat sink, which effectively insulates the heater wire 53 from the temperature controls. Further, the twisted bundle of nickel conductors 51 and heater wire 53 is covered with a fiberglass insulation sleeve 52 and further insulated by ceramic sleeves 54 and 56 to insure that the temperature controls are accurate and not influenced by their proximity to the wrap-around heater element 40. A terminal loop connector 55 is applied to the terminal end of the heater lead wire assembly 50 in a known manner.

Figure 8:
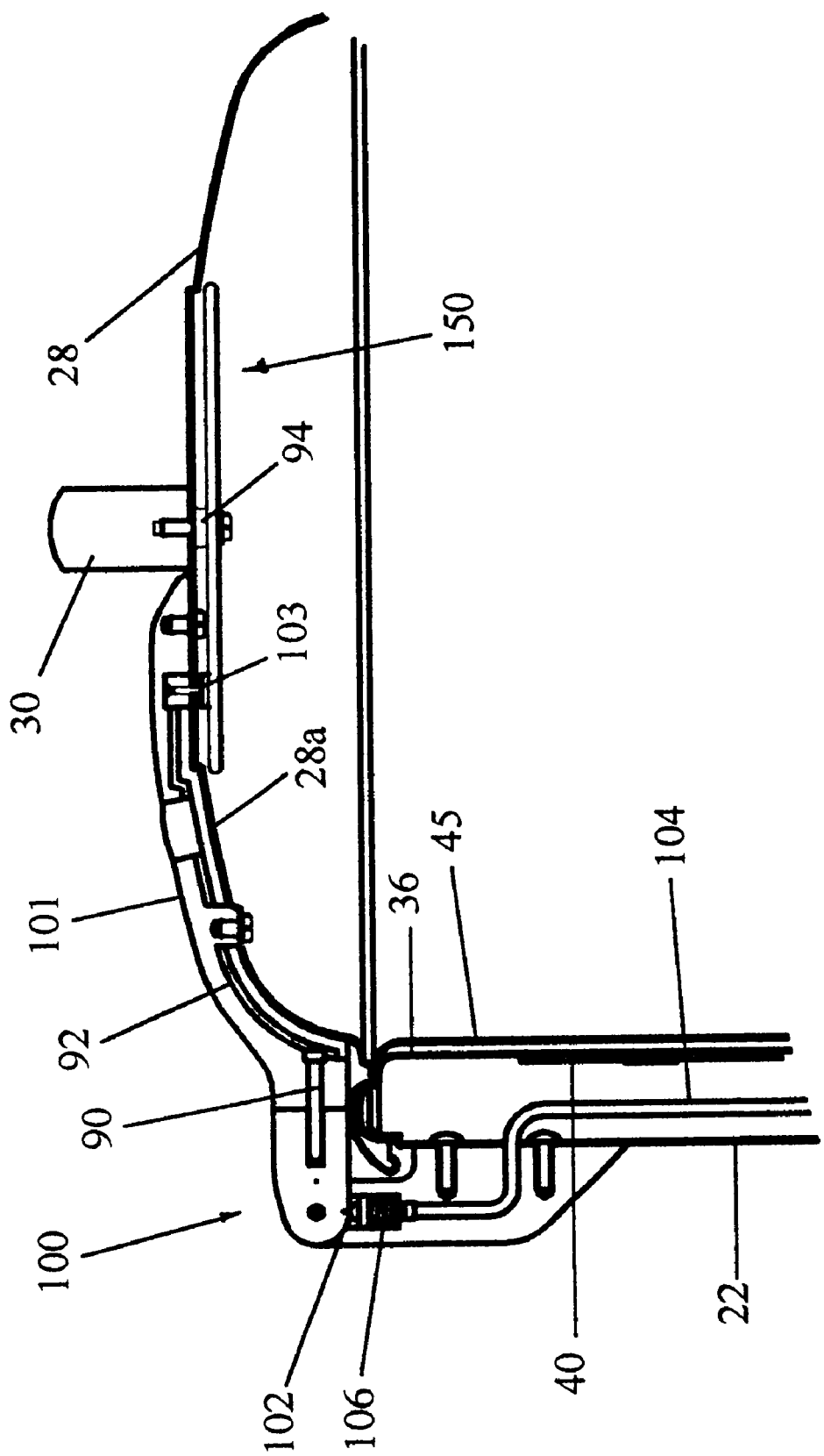
FIG. 8 is a partial cross-section view showing the top heating element within the lid.

In the preferred embodiment the top heating element 150 is generally oval in configuration to conform to the lid 28 and is constructed using the single-sided wire wrapping technique described hereinabove. As shown in FIG. 8, the top heating element 150 is mounted on the inner surface 28a of the lid 28. The top heating element 150 is electrically connected to the power source by a pin connector 103 attached by electrical wiring (not shown) to an electrical plug assembly 90 within the hinge mechanism 100.

The wiring is disposed within a wire channel 92 formed in the body 101 of the hinge and extends through the hinge mechanism, indicated generally at 100, to a power cord 104, which extends from the housing 22 as shown. An electrical circuit for the top heating element 150 is completed at contact 102 when the hinge mechanism 100 is in the closed position as shown in FIG. 8. A compression spring 106 maintains the electrical connection when the lid 28 is in the closed position.

Figure 9:
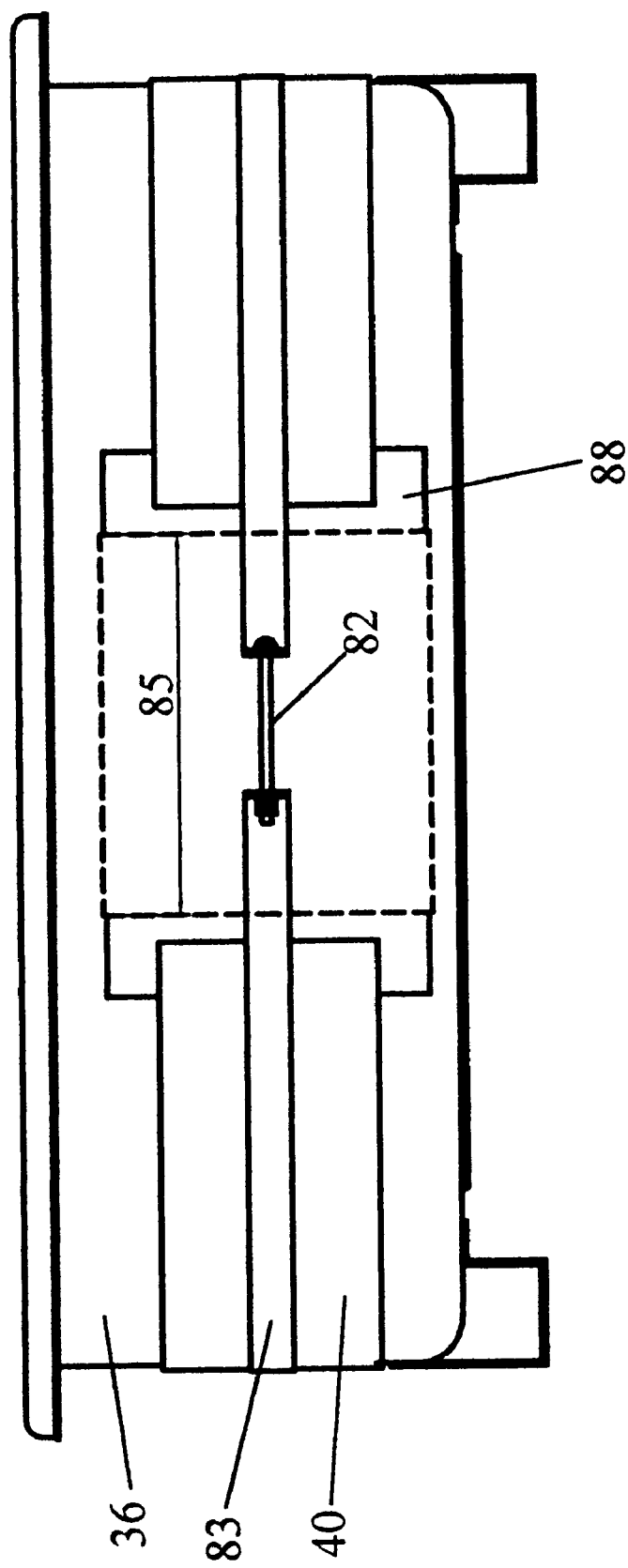
FIG. 9 is an enlarged front elevational view showing the wrap-around heating element installed about the deep well member of the present roasting oven.

In an assembly procedure of the present roasting oven 10, the wrap-around heating element 40 is secured to an outer surface of the heating well 36 by use of an adjustable band clamp, indicated generally at 83, as shown in FIG. 9. The band clamp 83 is constructed of sheet metal such as steel in the form of an elongated belt and includes a turnbuckle mechanism, indicated generally at 82, which is capable of securing the heating element 40 about the outer periphery of the heating well 36. The wrap-around heating element 40 is mounted onto studs 77 (FIGS. 6A and 6B) which are coupled to and project from the band clamp 83 in predetermined locations.

A plurality of elongated slots 79 (FIGS. 6A and 6B) are formed in the terminal ends of the wrap-around heater element 40 so as to be positioned in alignment with studs 77. Studs 77 engage the elongated slots 79 during assembly and provide for slight differences in length and movement between the interior and exterior insulation boards 72 and 74 and the supporting mica sheet 70.

Referring to FIG. 9, it will be noted that the wrap-around heating element 40 is fabricated to a predetermined length. During assembly it is positioned so as to leave a gap as at 85 corresponding to the position of the temperature control panel 38 and the circuit board 37, which are subject to heat damage. In the construction process the gap 85 may be filled with fiberglass insulation material, mica insulation board, or other appropriate insulating materials to protect the temperature controls.

Referring again to FIG. 8, the top heating element 150 is installed in spaced apart relation to the inner surface 28a of the lid 28 by the use of mounting brackets 94 which project downwardly from the lid 28 into the cooking vessel. In the preferred embodiment mounting brackets 94 are integrated into the handle 30 as shown in FIG. 8.

Figure 10:
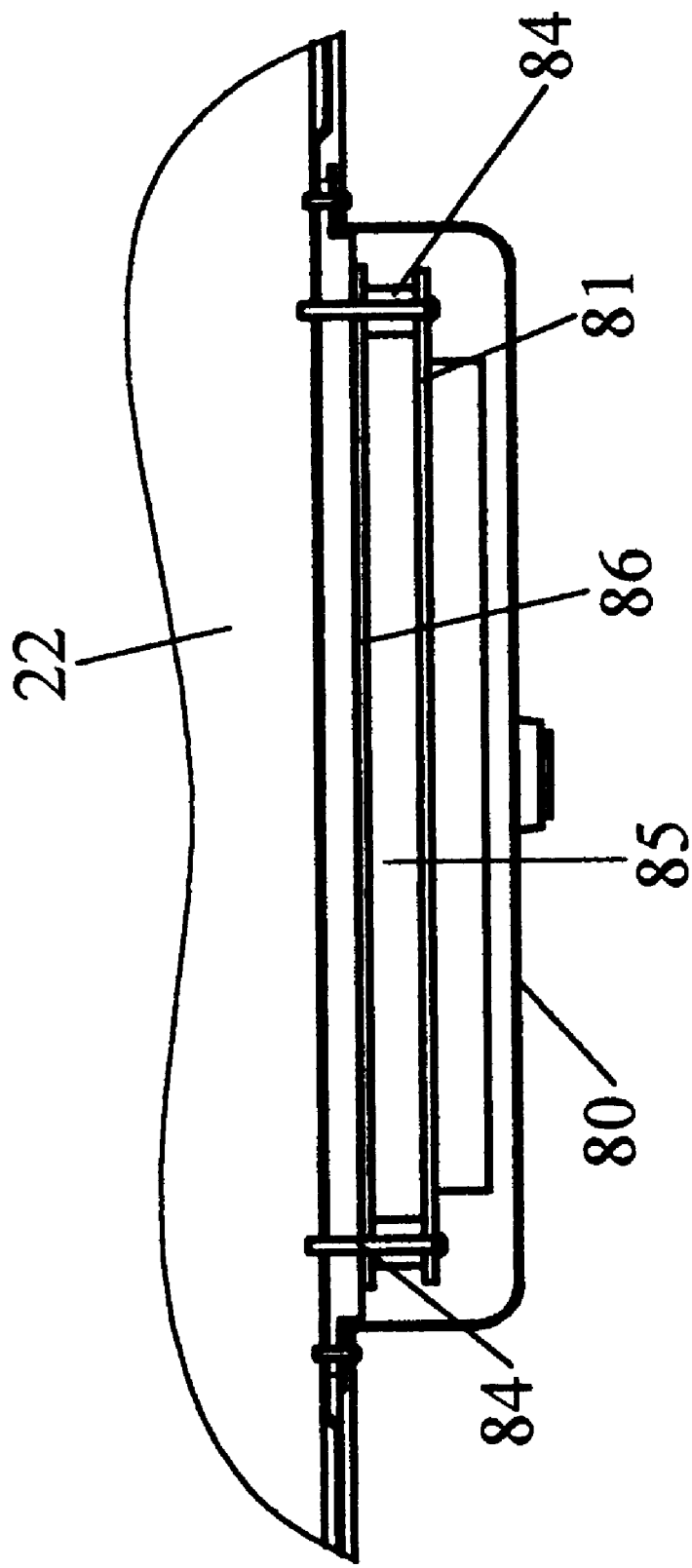
FIG. 10 is a cross-sectional view taken along section line 10–10 of FIG. 2A showing the power supply circuit board within the ventilated compartment.

It will be appreciated that because the present invention omits the conventional bottom heating element of the prior art, the temperatures achieved on the undersurface of the heating well 36 and housing 22 in operation are relatively lower in comparison to prior art cookers. Accordingly, the roasting oven 10 includes a ventilated compartment 80 as shown in FIG. 10, which is located on the undersurface of the housing 22 and functions to protect the power supply circuit board 81 from heat damage. This design isolates the power supply circuit board 81 from the rising heat of the oven and facilitates the use of the relatively high wattage heating elements 40 and 150 required for the large capacity of the present roasting oven.

The power supply circuit board 81 is mounted in space to-part relation to the undersurface of the housing 22 by the use of spacers 84 so as to create an air gap as at 85 to further isolate the circuit board 81 from the housing 22 and the heat source. In addition, a layer of mica insulation board or other suitable insulating material is installed as at 86 to further insulate and protect the power supply circuit board 81.

Figure 11:
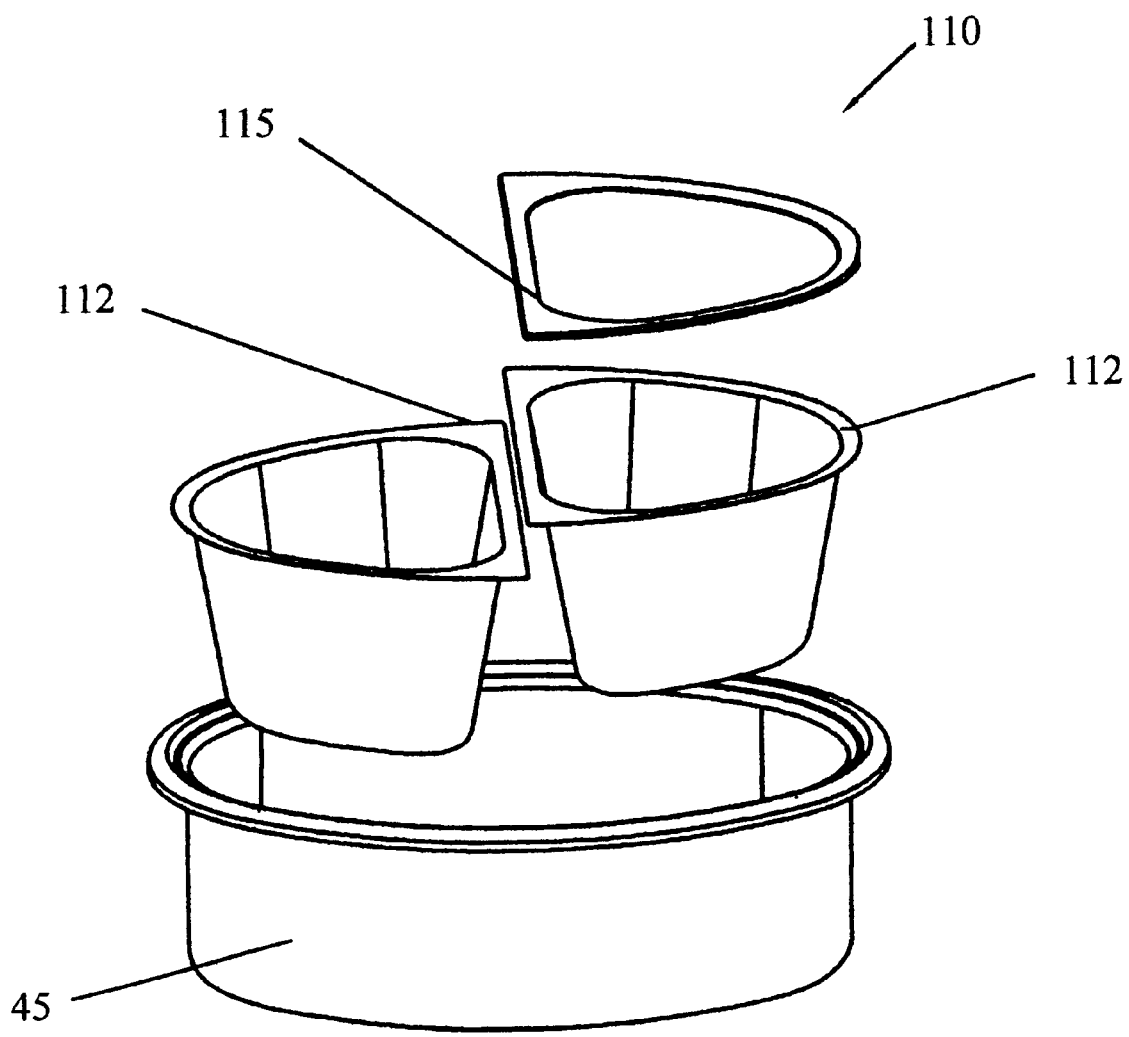
FIG. 11 is an exploded perspective view showing the optional serving set of the present invention.

Referring to FIG. 11 the present oven is provided with an optional serving set, indicated generally at 110. In the preferred embodiment the serving set is comprised of a plurality of serving containers 112 which closely conform to the shape and dimensions of the cooking liner 45 and are inserted therein. The serving containers 112 are provided with lids 115 to maintain the cooked food in warm condition. The serving set 110 is provided in a variety of materials and/surface finishes at the option of the consumer.

In summary, the present invention has been developed to provide a roasting oven having a large capacity (i.e. up to 26 quarts) that includes a flexible, wrap-around heating element which is disposed about the heating well for heating the sidewalls thereof and a top heating element for browning.

Both the wrap-around heating element and top heating element are electrically interconnected to a temperature control panel featuring a push-button control film interface for selectively energizing the heating elements. The present roasting oven also features an exterior ventilated compartment for housing the power supply circuit board for insulating the same from the high heat source necessary for a roasting oven of this capacity. The present roasting oven is also provided with an optional serving set for maintaining food in ready-to-eat condition and for reheating leftover food items.

Although not specifically illustrated in the drawings, it should be understood that additional equipment and structural components will be provided as necessary, and that all of the components described above are arranged and supported in an appropriate fashion to form a complete and operative roasting oven incorporating features of the present invention.

It is also understood that variations may be made in the present invention without departing from the scope of the invention. For example, the present roasting oven may utilize double-sided and also single-sided heater elements as disclosed herein, which may be advantageous for specific applications.

Moreover, although illustrative embodiments of the invention have been described, a latitude of modification, change, and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. A roasting oven comprising:

an outer housing having a hinged lid member;

a heating well residing within said housing, said heating well having a bottom surface with integrally formed sidewalls and an open top;

heating means including a top heating element disposed in said lid member and a wrap-around heating element radially disposed about said heating well and positioned intermediate said housing and said heating well, said heating elements being formed by wrapping heating wire about a mica insulation board having a plurality of notches formed in the lateral edges thereof at periodic intervals such that said heating wire can be engaged within said notches in a repeating pattern, said heating wire being tightly intertwined at the terminal ends thereof with a bundle of nickel lead wires to form a heat sink;

temperature controlling means electrically interconnected to said heating means for regulating the temperature of said heating elements, said temperature controlling means being insulated from said heating elements by said heat sink; and function controlling means electrically interconnected to said temperature controlling means and to said heating elements enabling said top heating element and said wrap-around heating element to be selectively energized to provide variable cooking modes.

2. The roasting oven of claim 1 wherein said heating wire is alternately traversed across said mica insulation board between diagonally opposed pairs of said notches and then interlaced between adjacent pairs of said notches in a predetermined pattern such that at least 75% of said heating wire is disposed on a first side of said mica insulation board.

3. The roasting oven of claim 1 wherein said mica insulation board is constructed in the form of an elongated belt.

4. The roasting oven of claim 3 wherein said heating wire is wrapped in continuous revolutions about said mica insulation board between diagonally opposed pairs of said notches to produce said repeating pattern.

5. The roasting oven of claim 4 wherein said mica insulation board including said heater wire is captured between a plain interior and a plain exterior mica insulation board to form a heating belt assembly.

6. The roasting oven of claim 5 wherein said heating belt assembly is riveted at periodic intervals along the length thereof to maintain alignment of said mica insulation boards after installation of said assembly about said heating well.

7. The roasting oven of claim 6 wherein said heating belt assembly is secured to the external periphery of the side wall of said heating well by an adjustable band clamp.

8. The roasting oven of claim 1 wherein said twisted bundle of heater wire and said nickel lead wires is covered with a fiberglass insulation sleeve and at least one ceramic sleeve to form a lead wire assembly.

9. The roasting oven of claim 1 wherein said housing and said heating well are oval in configuration.

10. The roasting oven of claim 1 wherein a removable cooking liner conforming to the dimensions of said heating well is provided.

11. The roasting oven of claim 10 wherein a serving set comprised of of a plurality of food containers conforming to the dimensions of said liner is provided.

12. The roasting oven of claim 1 wherein said cooking liner has a large capacity ranging up to 26 quarts.

13. An improved roasting oven having an outer housing with a hinged lid, a heating well residing within said housing including a bottom surface with integrally formed side walls and an open top defining a cooking vessel, a heat source disposed in heating relation to said heating well and a temperature control switch electrically interconnected to said heat source, wherein the improvement comprises:

a wrap-around heating element radially disposed about said side walls and intermediate said heating well and said housing and electrically interconnected to said temperature control switch and a top heating element disposed in said lid and electrically interconnected to said temperature control switch, said heating elements being formed by wrapping heating wire about a mica insulation board having a plurality of notches formed in the lateral edges thereof at periodic intervals such that said heating wire can be engaged within said notches in a repeating pattern, said heating wire being tightly intertwined at the terminal ends thereof with a bundle of nickel lead wires to form a heat sink, said heat sink insulating said temperature control switch from said heating elements; and a function controlling means electrically interconnected to said temperature control switch, said top heating element, and said wraparound heating element enabling each of said heating elements to be energized individually and in combination.

14. The roasting oven of claim 13 further including a ventilated compartment mounted on an undersurface of said housing, said compartment containing and protecting a power supply circuit board for said roasting oven.

15. The roasting oven of claim 14 wherein said heating well has a capacity ranging up to 26 quarts.

16. The roasting oven of claim 15 wherein said heating well is oval in configuration.

17. The roasting oven of claim 16 wherein a serving set comprised of a plurality of food containers conforming to said oval configuration is provided.

* * * * *